Dec. 19, 1944.  H. H. VANDERZEE  2,365,229
PIVOTED LINK CHAIN
Filed Dec. 4, 1942
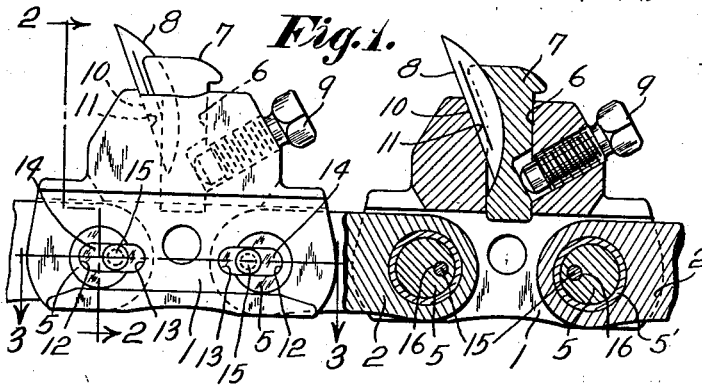
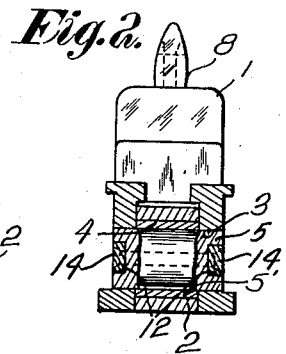
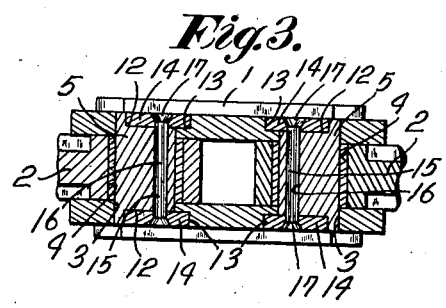
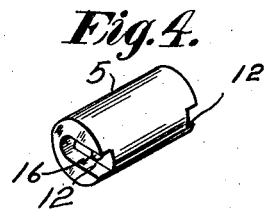
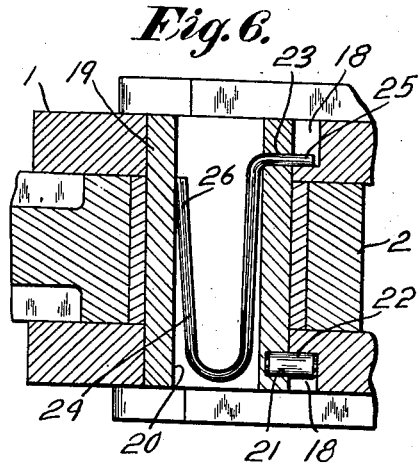
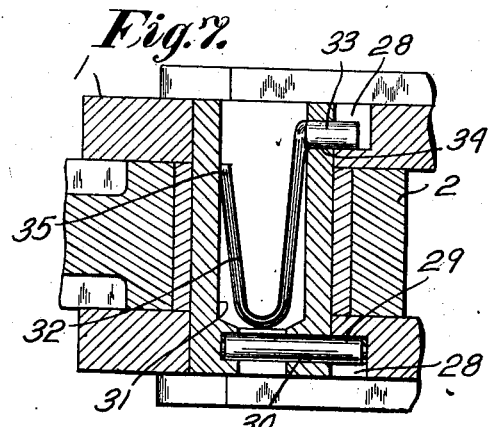
Inventor.
Harry H. Vanderzee.
by
Louis A. Maxson
atty.

Patented Dec. 19, 1944

2,365,229

UNITED STATES PATENT OFFICE 2,365,229

PIVOTED LINK CHAIN

Harry H. Vanderzee, Michigan City, Ind., assignor to Sullivan Machinery Company, a corporation of Massachusetts Application December 4, 1942, Serial No. 467,913

17 Claims. (Cl. 74—251)

This invention relates to a chain link connection, and more particularly to a hinge pin connection for a pivoted link chain.

In pivoted link chains, and especially in pivoted link cutter chains used for mining purposes, there is usually provided a series of relatively heavy chain blocks pivotally connected by a series of strap links. In such chains the chain blocks which carry the cutter bits are relatively expensive, and it is desirable for economic reasons to concentrate wear on the cheaper parts of the chain. Therefore, to avoid wear of the chain blocks the hinge pins which connect the blocks and strap links together are held stationary with respect to the blocks, so that wear is concentrated on the relatively inexpensive strap links. This is usually accomplished by the provision of a releasable lock connection between the pivot pins and the blocks.

It is accordingly an object of the present invention to provide an improved chain link connection wherein wear of the chain elements is concentrated on the parts which may be relatively cheaply replaced. Another object is to provide an improved hinge pin lock for holding the hinge pins of a pivoted link chain against rotation with respect to the more expensive chain elements, thereby to concentrate wear on the cheaper parts of the chain. A further object is to provide an improved chain link connection for a pivoted link chain. A further object is to provide a novel hinge pin connection between the chain blocks and strap links of an endless cutter chain. A still further object is to provide a novel hinge pin lock. Other objects and advantages of the invention will, however, hereinafter more fully appear.

In the accompanying drawing there are shown for purposes of illustration several forms which the invention may assume in practice.

In this drawing:

Fig. 1 is a view partially in side elevation and partially in longitudinal vertical section through a section of a cutter chain in which the preferred illustrative embodiment of the invention is incorporated.

Fig. 2 is a cross sectional view taken substantially on line 2—2 of Fig. 1.

Fig. 3 is a longitudinal sectional view taken substantially on line 3—3 of Fig. 1.

Fig. 4 is a perspective view of one of the hinge pins shown in Fig. 1.

Fig. 5 is a perspective view of one of the pin locking elements.

Fig. 6 is an enlarged sectional view taken on the plane of Fig. 3, illustrating a modified form of hinge pin construction.

Fig. 7 is a view similar to Fig. 6 showing a further modified hinge pin construction.

In the several embodiments of the invention disclosed herein the novel hinge pin connection is associated with an endless cutter chain especially designed for use in the cutting of coal. It will be evident, however, that the invention may be incorporated in other types of chains.

In Fig. 1 there is shown a cutter chain comprising a series of chain blocks 1 which are pivotally connected together by strap links 2. The blocks and strap links have alined transverse bores 3 and 4 respectively which receive hinge pins 5. Usual bearing sleeves 5' surround the hinge pins between the latter and the strap link bores to reduce wear of the links. Each chain block has a right angle socket 6 for receiving a detachable holder 7 for a cutter bit 8, and the holder is held in bit clamping position by a conventional set screw 9. The cutter bit is generally of "crescent" shape in side elevation, and has its forward face 10 resting against a front abutment surface 11 on the chain block. The cutter bit and its mounting and holding means may be the same as those described and claimed in a copending application Serial No. 468,516, filed December 10, 1942, in which I am one of the joint inventors.

In the preferred illustrative embodiment of the novel hinge pin connection shown in Figs. 1 to 5, inclusive, each of the hinge pins 5 has extending at least partially across the ends thereof transverse slots or grooves 12 which are disposable in registry with notches or recesses 13 in the sides of the chain blocks. Seated snugly in these pin slots 12 and projecting within the block recesses 13 are flat locking elements or plates 14 which serve to interlock the hinge pins with the chain blocks. These locking plates are arranged flush with the ends of the hinge pins and are held in operative position by cross rivets 15 extending through openings or bores 16 passing lengthwise through the hinge pins in noncoaxial relation therewith. When the rivets are headed over at their ends, as at 17, the locking plates 14 are held firmly in locking position. The rivets may be readily released by shearing off one of the rivet heads and driving out the rivets from the pin bores. It is accordingly evident that the hinge pins are held against rotation with respect to the chain blocks 1 so that wear is concentrated on the relatively inexpensive strap links 2.

In the modification shown in Fig. 6 the sides of each of the chain blocks are notched or grooved at 18, and a hinge pin 19 has an axial bore 20 extending therethrough. The hinge pin is formed with a recess 21 which receives a relatively short locking pin 22. The pin 22 projects into one of the block recesses 18. The hinge pin near its opposite end has a radial opening 23, and a reversely bent wire spring 24 arranged in the pin bore has a lateral end portion 25 passing through the opening 23 into the other block recess 18. The spring 24 has its other end 26 pressing against the opposite wall of the pin bore so that the spring end locking portion 25 is maintained in operative position. The spring may be pressed inwardly to effect withdrawal of the end portion 25 from the block recess 18, thereby enabling endwise removal of the hinge pin from the block. As the hinge pin is moved in an endwise direction with respect to the block bore, the relatively short locking pin 22 is withdrawn from the block recess. As in the preferred construction, usual bearing sleeves surround the hinge pins between the latter and the walls of the strap link bores to reduce link wear.

In the modified construction shown in Fig. 7, each chain block has recesses 28, one of which receives an end of a relatively long locking pin 29, the latter herein arranged in a radial opening 30 in the hinge pin and extending across the reduced end of a hinge pin bore 31. Arranged in the hinge pin bore is a reversely bent wire spring 32 having a pinlike end portion 33 extending through a radial opening 34 in the walls of the hinge pin into the other of the block recesses 28. As in the modified embodiment above described, the spring has an end 35 pressing against the opposite wall of the pin bore for holding the portion 33 in place. When the spring is pressed inwardly to withdraw its end portion 33 from the block recess 28, the hinge pin may be moved axially from the block bore. As in the other modification, when the hinge pin is moved axially, the end of the locking pin 29 is withdrawn from the block recess.

As a result of this invention a novel hinge pin connection is provided wherein wear is concentrated on the relatively inexpensive chain parts. It will further be evident that by the provision of the novel hinge pin lock the hinge pins are held against rotation with respect to the more expensive chain blocks. Also by the provision of the novel locking means, the hinge pins may be readily inserted in position and released. Other uses and advantages of the invention will be clearly apparent to those skilled in the art.

While there are in this application specifically described several forms which the invention may assume in practice, it will be understood that these forms of the same are shown for purposes of illustration and that the invention may be further modified and embodied in various other forms without departing from its spirit or the scope of the appended claims.

What I claim as new and desire to secure by Letters Patent is:

1. A chain including a series of chain elements pivotally connected together by hinge pins, said pins having openings extending lengthwise therethrough, transverse openings in said pins near their opposite ends, recesses in certain of said chain elements, said transverse pin openings being disposable in registry with said recesses, separate non-deformable, rigid locking elements at the opposite ends of said pins, said locking elements arranged in said transverse openings and projecting into said recesses, and means cooperating with at least one of said locking elements of each pin and extending within the longitudinal pin opening for retaining a locking element in operative position.

2. A chain including a series of chain elements pivotally connected together by hinge pins, said pins having openings extending lengthwise therethrough, transverse openings in said pins near their opposite ends, recesses in certain of said chain elements, said transverse pin openings being disposable in registry with said recesses, separate non-deformable, rigid locking elements at the opposite ends of said pins, said locking elements arranged in said transverse openings and projecting into said recesses, and means extending through the longitudinal pin opening of each pin and cooperating with said locking elements for retaining the same in operative position.

3. A chain including a series of chain elements pivotally connected together by hinge pins, said pins having openings extending lengthwise therethrough, transverse openings in said pins near their opposite ends, recesses in certain of said chain elements, said transverse pin openings being disposable in registry with said recesses, separate locking elements at the opposite ends of said pins, said locking elements arranged in said transverse openings and projecting into said recesses, and means cooperating with at least one of said locking elements of each pin and extending within the longitudinal pin opening for retaining a locking element in operative position, said retaining means comprising a spring arranged in said longitudinal pin opening and pressing against the walls thereof.

4. A chain including a series of chain elements pivotally connected together by hinge pins, said pins having openings extending lengthwise therethrough, transverse openings in said pins near their opposite ends, recesses in certain of said chain elements, said transverse pin openings being disposable in registry with said recesses, separate locking elements at the opposite ends of said pins, said locking elements arranged in said transverse openings and projecting into said recesses, and means cooperating with at least one of said locking elements of each pin and extending within the longitudinal pin opening for retaining a locking element in operative position, said retaining means comprising a reversely bent spring arranged in said longitudinal pin opening and pressing against the walls thereof.

5. A chain including a series of chain elements pivotally connected together by hinge pins, said pins having openings extending lengthwise therethrough, transverse openings in said pins near their opposite ends, recesses in certain of said chain elements, said transverse pin openings being disposable in registry with said recesses, separate rigid, non-deformable locking elements at the opposite ends of said pins, said locking elements arranged in said transverse openings and projecting into said recesses, and a replaceable rivet extending through said longitudinal pin opening of each pin and engaging the locking elements for maintaining the latter in operative position.

6. A chain including a series of chain elements pivotally connected together by hinge pins, said pins having transverse grooves at their ends disposable in registry with recesses in certain of the chain elements, rigid non-deformable locking elements arranged in said pin grooves and projecting within said recesses, and removable means associated with said pins and extending lengthwise of the latter for holding said locking elements in operative position, said holding means being deformable to effect release of said locking elements.

7. A chain including a series of chain elements pivotally connected by hinge pins, and means for holding said hinge pins against rotation with respect to certain of said chain elements including openings extending longitudinally through the pins in non-coaxial relation therewith, locking elements arranged at the opposite ends of each pin, said pins and said chain elements having recesses for receiving said locking elements, said pin recesses extending only part way across the ends of said pins so that the surface at one side of each pin is unbroken, and a removable member extending through said non-coaxial pin opening and engaging said locking elements for retaining the same in operative position.

8. A chain including a series of chain elements pivotally connected by hinge pins, and means for holding said hinge pins against rotation with respect to certain of said chain elements including transverse grooves extending partially across the ends of the hinge pins and opening through the side thereof, recesses in certain of the chain elements, said pin grooves being disposable in registry with said recesses, separate rigid, non-deformable locking elements in said pin grooves and projecting into said recesses, and a replaceable rivet passing longitudinally through an opening in each hinge pin for engaging the locking elements for holding the latter in operative position.

9. A chain including a series of chain elements pivotally connected together by hinge pins, said pins having openings extending lengthwise therethrough, a rigid, non-deformable locking element engaging said hinge pin and projecting within a recess in an adjacent chain element, and means arranged generally longitudinally within said longitudinal pin opening and connected to said locking element for holding the latter in operative position.

10. In combination, a pair of chain elements, a hinge pin for pivotally connecting said elements together, and means for holding said hinge pin against rotation with respect to one of said chain elements including a rigid, non-deformable transverse locking element for interlocking said hinge pin with said one of said chain elements, and means extending lengthwise of said hinge pin and engaging said locking element for holding the latter in operative position.

11. In combination, a pair of chain elements, a hinge pin for pivotally connecting said elements together, said pin having an opening extending longitudinally therethrough, and means for holding said hinge pin against rotation with respect to one of said chain elements including a transverse locking member for interlocking said hinge pin with said one of said chain elements, said locking member being rigid and non-deformable, and means arranged in said pin opening and separate from said locking member, and engaging said locking member for releasably holding the latter in operative position, said holding means being changeable in shape upon release of said locking member.

12. A chain including a series of chain elements pivotally connected together by pivot members, and locking means for said pivot members including recesses in the opposite sides of certain of said chain elements, separate rigid locking elements at the opposite ends of each pivot member and engaged in said recesses, and releasable holding means for at least one of said locking elements of each pivot member for releasably holding the same in its recess, said holding means extending generally longitudinally of each pivot member.

13. A chain including a series of chain elements pivotally connected together by pivot members, each pivot member having an opening extending lengthwise thereof, and locking means for said pivot members including recesses in the opposite sides of certain of said chain elements, separate rigid locking elements at the opposite ends of each pivot member and engaged in said recesses, and releasable holding means for at least one of said locking members of each pivot member for releasably holding the same in its recess, said holding means extending generally longitudinally of said pivot members within said longitudinal openings thereof.

14. A chain including a series of chain elements pivotally connected together by pivot members, said pivot members having openings extending lengthwise therethrough, separate non-deformable, rigid locking elements at the opposite ends of said pivot members for locking the latter against rotative and axial movements with respect to the chain elements to which they are locked, and releasable deformable means cooperating with at least one of said locking members for each pivot member and extending generally longitudinally within said longitudinal openings in said pivot members for retaining at least one locking member for each pivot member in operative locking position.

15. A chain including a series of chain elements pivotally connected together by hinge pins, each pin having a longitudinal bore, and a hinge pin lock including recesses in the opposite sides of certain of said chain elements, separate rigid, non-deformable locking elements at the opposite ends of the pins and engaged in said recesses, and deformable holding means for at least one of said locking elements for each pin and arranged in said pin bore.

16. A chain including a series of chain elements pivotally connected together by hinge pins, and a hinge pin lock including recesses in the opposite ends of certain of said chain elements, openings in the hinge pins disposable in registry with said recesses, separate rigid, non-deformable locking elements at the opposite ends of the pins and engaged in said openings and recesses, and deformable holding means for at least one of said locking elements for each pin extending generally lengthwise of said pins.

17. A chain including a series of chain elements pivotally connected together by hinge pins, and a hinge pin lock including recesses in the opposite sides of certain of said chain elements, openings in the pins in registry with said recesses, separate rigid, non-deformable locking elements arranged in said pin openings and projecting into said recesses for interlocking the pins with said certain ones of the chain elements, and releasable holding means for at least one of said locking elements for each pin extending generally lengthwise of said pins, said holding means being deformable to effect locking element release.

HARRY H. VANDERZEE.